Oct. 29, 1957     O. H. SCHMITZ     2,810,910
METHOD FOR DRIVING BOLTS INTO METALLIC BODIES
Filed Dec. 16, 1954
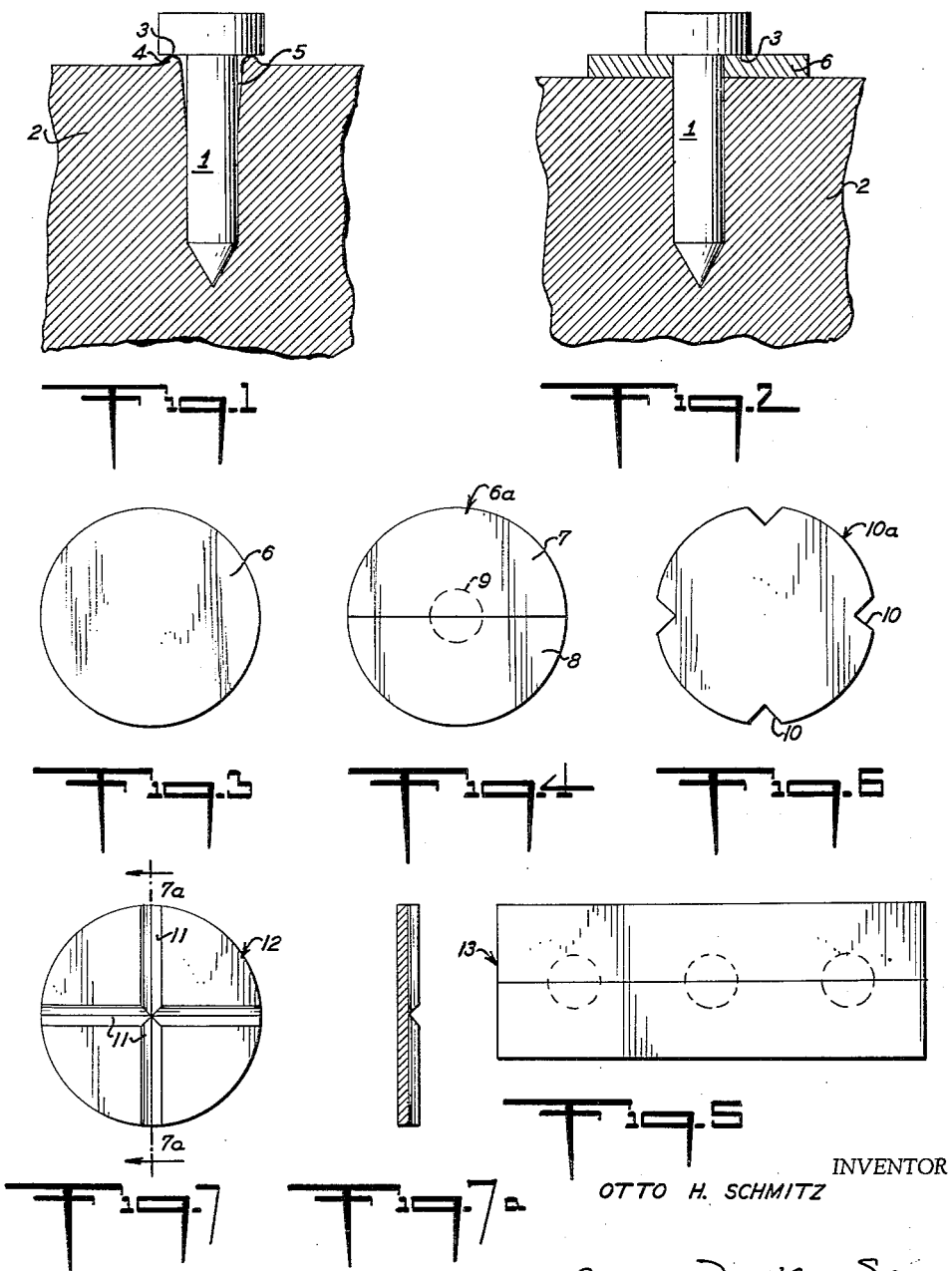
INVENTOR
OTTO H. SCHMITZ
BY *Burgess, Dinklage & Sprung*
ATTORNEYS United States Patent Office 2,810,910
Patented Oct. 29, 1957

2,810,910

METHOD FOR DRIVING BOLTS INTO METALLIC BODIES

Otto H. Schmitz, Braunschweig, Germany, assignor to Walter Schulz, Wulfrath, Rhineland, Germany Application December 16, 1954, Serial No. 475,690

Claims priority, application Germany February 4, 1954

7 Claims. (Cl. 1—60)

The present invention relates to the driving of bolts into metal, especially metal parts of considerable wall thickness, by means of powder power driving tools.

When driving bolts into metal, especially iron plates of considerable wall thickness, by means of powder power driving tools, that portion of the material which surrounds the driven-in bolt frequently bulges. These bulged portions not only impair the appearance but frequently also impair a proper fit of the parts to be connected by the driven-in bolt.

It has furthermore been observed that the fit of the bolt in the material is the less, the greater the bulging produced. Particularly in the so-called full material, i. e. the material which has a thickness equaling or thicker than the length of the bolt, the bolt fits especially poorly.

It is, therefore, an object of the present invention to provide a method and means which will overcome the above mentioned drawbacks.

It is another object of this invention to provide means which will prevent the material into which the bolt is driven from bulging while simultaneously securing a proper tight fit of the bolt in the material.

These and other objects and advantages of the invention will appear more clearly from the following specification in connection with the accompanying drawings in which:

Fig. 1 illustrates a section through a metal part into which a bolt has been driven in the heretofore known manner.

Fig. 2 illustrates a similar section through a metal part into which a bolt has been driven in conformity with the present invention.

Fig. 3 illustrates a one-piece disc for use in connection with the method according to the present invention.

Fig. 4 is a split disc for use in connection with the present invention.

Fig. 5 shows an arrangement according to the present invention for use in connection with the driving of bolts into metal parts.

Fig. 6 shows a modified disc for use in connection with the present invention.

Figs. 7 and 7a illustrate a top view and section respectively of a disc according to the present invention.

*General arrangement*

It has been found according to the present invention that the heretofore experienced bulging of the iron parts into which a bolt is driven by a powder power tool can be avoided by placing a metal support for instance a metal disc on that portion of the respective metal part into which the bolt is to be driven. The said metal support must be of a metal which is somewhat softer than the metal into which the bolt is to be driven. Supports of duralumin have proved particularly advantageous in this connection.

When driving bolts into wood or similar soft material, it is known to employ metal discs provided with a bore therethrough and to place such discs upon the portion of the wood into which the bolt is to be driven in order to prevent the bolt from entering the wood beyond the desired extent. In other words these metal discs offer the head or shoulder of the bolt sufficient resistance to limit the depth of penetration of said bolt. With this method, the support must be harder than the material into which the bolt is to be driven in order to serve its desired purpose. When driving bolts into iron or other metal parts, such metal supports have heretofore not been employed because the employment of such metal supports or discs as they were used for preventing the penetration of a bolt into wood beyond the desired extent was considered senseless. The bolt which is driven into iron never enters into the iron beyond its shoulder or head because the iron material offers the shoulder too great a resistance to allow the shoulder or head of the bolt to enter the material. Surprisingly it has been found according to the present invention that the placing of such discs upon iron has the astounding effect that the bolt is considerably better anchored in the material while the heretofore encountered bulging of the iron part into which the bolt is driven is avoided. This phenomenon may be explained as follows:

When the bolt is entering the material, such volume of the iron part into which the bolt is driven has to be displaced as corresponds to the volume of the respective shaft of the bolt. If the metal support according to the invention is not employed, at the beginning of the penetration of the bolt into the material of the iron part, the material of the iron part is primarily displaced toward the outside, i. e. in a direction counter to the direction of driving of the bolt, because the material of the iron part does not encounter any resistance in its displacement toward the outside. When the bolt enters deeper into the iron part, the decrease in volume of the iron part is effected by compression of the material of the iron part in the direction transverse to the axis of the bolt. Only at those portions at which this compression of the material occurs will the bolt tightly contact the material of the iron part so that the necessary adherence of the bolt to the iron part is obtained. However, the material which during the initial entering phase of the bolt into the iron part was displaced toward the outside cannot be reduced any more to any appreciable extent and thus forms the bulging portion below the head of the bolt. However, if in conformity with the present invention a metal disc is placed upon the portion into which the bolt is to be driven, said placing of said metal disc being effected prior to the driving of the bolt into the iron part, the bulging or displacing of the material of the iron part toward the outside during the initial driving-in phase of the bolt is prevented. This is due to the fact that the disc material is pressed under great force against the material of the iron part into which the bolt enters and thus offers a great resistance against any displacement of the material of the iron part toward the outside. This resistance increases with increasing bulging of the displaced material, i. e. with increasing bulging surface. By selecting the proper hardness and thickness of the disc, it will be made possible that the bulging out material of the iron or metal part will be compressed by the said disc so that not only will there be no noticeable bulged-out portion of the metal part below the disc, but the shaft of the bolt will along its entire shaft surface properly contact the material of the metal part so that the adherence and tight fit of the bolt in the said metal part will be considerably increased. Tests conducted in an effort to pull the bolt out of the aluminum alloy part into which it had been driven have proved that when employing the metal disc according to the present invention, the tight fit of the bolt in the aluminum alloy part is about from five to ten times greater than without the employment of the metal disc in conformity with the present invention. The comparative tests have, of course, been conducted under otherwise the same conditions, i. e. with the employment of the same type of bolts or studs and with the same type and magnitude of the driving force. Preferably the method according to the invention is carried out with a solid disc, i. e. a disc having no hole therethrough. If a disc with hole is to be used, the hole has to have a diameter which is less than the outer diameter of the shaft of the bolt so that the rim of the disc will tightly contact the shaft of the bolt.

The support according to the invention may also be formed of a split disc so that following the driving in of the bolt into the metal part, the sections of the disc support can easily be removed. If desired, the disc may be provided with one or more notches which will facilitate a breaking of the disc.

It has furthermore been found that the supporting disc also serves as a guide for the bolt and thus effectively counters any tendency of the bolt to bend.

Structural arrangement

Referring now to the drawings in detail and Fig. 1 thereof in particular, this figure illustrates the heretofore known method according to which the bolt 1 is driven into the metal part 2 without placing a metal support or metal disc upon that portion of the metal part 2 into which the bolt 1 is to be driven. Since the material of the metal part can be displaced outwardly and thus form the bulge 4, the material does not tightly engage the shaft area 5 of the bolt. This area of the shaft is therefore ineffective in the anchoring of the bolt in the metal part. The zone of the metal part in which a compression of the material has been effected is indicated in Fig. 1 by increased shading.

Fig. 2 shows the same bolt driven into the same metal part 2 while employing a support disc 6 placed upon the metal part 2 in conformity with the present invention. Since the material of the metal part 2 could not escape toward the outside, it has been compressed from the upper surface of the metal part 2 downwardly into the material of the metal part as indicated by increased shading. It will be evident from the above, that in this way the tight fitting contact area of the shaft of the bolt has been considerably increased and therefore the bolt is considerably better anchored in the metal part 2.

Fig. 3 illustrates a support disc 6 for use in connection with the present invention which disc is a solid disc and may consist of duralumin.

Fig. 4 shows a support disc 6a likewise for use in connection with the present invention, which disc consists of two sections 7 and 8. The split disc 6a is to be placed on the surface of the metal part into which the bolt is to be driven, in such a manner that after the bolt has been driven into the metal part, its axis is substantially coaxial with the axis of the disc 6a so that the cross section of the shaft of the bolt will be located in the area 9 indicated by dashed lines. This makes is possible following the driving in of the bolt 1 into the metal part 2 easily to remove the disc sections from the bolt and the metal part 2.

Fig. 5 illustrates a split support 13 likewise for use in connection with the present invention which makes it possible to drive a plurality of bolts arranged in proximity to each other into the metal part 2.

The support disc 10a shown in Fig. 6 is provided with notches at the periphery of the disc. Preferably at least two notches are arranged so that they will be located diametrically opposite to each other. However, if desired more than two notches may be provided. These notches will facilitate the breaking up of the disc in a plurality of parts after the bolt has been driven into the respective metal part.

Figs. 7 and 7a show a further support disc 12 in view and in section respectively. As will be seen from these figures, the disc 12 is provided with grooves 11 crossing each other. Of course, if desired, only one groove may be provided or there may also be provided more than two grooves. Such a disc will break into a plurality of parts when the bolt is driven into the metal part 2, and the thus broken parts of the disc can then easily be removed after the bolt has been driven into the metal part 2.

The carrying out of the method according to the present invention is very simple. The support 6, 6a, 10a, 12 or 13 respectively is placed on that portion of the metal part 2 into which the bolt is to be driven. To this end, the support may be fastened to the surface of the metal part 2 by means of a non-hardening adhesive, or clamps or similar devices may be mounted on the driving tool which will hold the disc in the desired position relative to the barrel mouth of the driving tool so that when the driving tool is placed into driving position, the disc will be pressed between the surface of the metal part 2 and the mouth of the barrel of the driving tool. The material of the discs must not be too thin or too soft because too thin or too soft material of the discs will not offer sufficient resistance against the above referred to bulging. Tests have proved that the thickness of the discs may advantageously be selected as about 0.7 times the diameter of the shaft of the bolt. On the other hand, the discs must not be too thick and the material must not be too hard because otherwise the disc will offer too great a resistance against the entering of the bolt into the metal part 2. This would mean a loss in energy of the bolt when penetrating the disc so that the bolt might not have sufficient energy left in order to penetrate into the metal part 2 up to the shoulder and sufficiently to compress the material surrounding the shaft of the bolt.

Tests carried out with a disc material the hardness of which equalled the hardness of the material of the metal part 2 have proved that the disc material bulged in the driving direction and was pressed into the material of the metal part 2. In this way the contacting surface of the bolt shaft with the adjacent material of the metal part 2 was decreased which in turn decreased the adhesion of the bolt to the metal part 2.

It is, of course, evident from the above that the shape of the supporting disc is immaterial and, therefore, discs of different shape, for instance, of square shape may be employed.

If a plurality of bolts are to be driven into the metal part 2 with the bolts arranged adjacent each other for instance along a line, a supporting disc or strip may be employed which covers an area extending over a length corresponding to the row of bolts. The employment of such strip or disc has the advantage that after driving the first or the first two bolts into the metal part 2, the support is fixed to the metal part 2 and no further means are necessary to hold said strip or disc for the driving of the other bolts.

It is, of course, understood that the present invention is, by no means, limited to the particular arrangement shown in the drawings but also comprises any modifications within the scope of the appended claims.

What I claim is:

1. In the method of embedding a stud in an iron body in which the stud is driven by an explosive charge into the iron body with one end thereof embedded in the iron body and the other end thereof protruding from the iron body, the improvement for more firmly anchoring the stud in the body which comprises driving the stud into the body through an aluminum alloy member maintained in surface engagement with the body during the driving of the stud therein.

2. Improvement according to claim 1, in which said aluminum alloy member has a thickness of about 0.7 times the diameter of the stud.

3. Improvement according to claim 2, in which said aluminum alloy member is a disc shaped member.

4. Improvement according to claim 3, in which said aluminum alloy member is a duralumin member.

5. Improvement according to claim 1, which includes removing said aluminum alloy member after the driving of said stud.

6. Improvement according to claim 1, in which said aluminum alloy member is a duralumin member.

7. Improvement according to claim 6, in which said aluminum alloy member is a disc shaped member.

References Cited in the file of this patent

UNITED STATES PATENTS

| | | |
|---|---|---|
| 169,734 | Schalck | Nov. 9, 1875 |
| 414,519 | Gladding | Nov. 5, 1889 |
| 746,006 | Brigham | Dec. 8, 1903 |
| 2,045,333 | Pipes | June 23, 1936 |
| 2,213,435 | Temple | Sept. 3, 1940 |
| 2,308,006 | Hendrickson | Jan. 12, 1943 |
| 2,380,204 | Turechek | July 10, 1945 |
| 2,518,395 | Sopris | Aug. 8, 1950 |
| 2,576,473 | Meyers | Nov. 27, 1951 |
| 2,660,726 | Weingart | Dec. 1, 1953 |
| 2,731,636 | Bulmiller | Jan. 24, 1956 |